United States Patent
Gonzaga et al.

(10) Patent No.: US 10,065,462 B2
(45) Date of Patent: Sep. 4, 2018

(54) DEVICE FOR ASSEMBLING-DISASSEMBLING A TYRED WHEEL, AS WELL AS MACHINE COMPRISING SUCH A DEVICE

(71) Applicant: Butler Engineering & Marketing S.p.A., Rolo (Reggio Emilia) (IT)

(72) Inventors: Tullio Gonzaga, Correggio (IT); Silvano Santi, Sasso Marconi (IT)

(73) Assignee: BUTLER ENGINEERING AND MARKETINGS S.P.A., Rolo (Reggio Emilia) (IT)

(*) Notice: Subject to any disclaimer, the term of this patent is extended or adjusted under 35 U.S.C. 154(b) by 444 days.

(21) Appl. No.: 14/809,596

(22) Filed: Jul. 27, 2015

(65) Prior Publication Data

US 2016/0023524 A1    Jan. 28, 2016

(30) Foreign Application Priority Data

Jul. 28, 2014   (IT) .............................. VR2014A0194

(51) Int. Cl.
*B60C 25/00* (2006.01)
*B60C 25/05* (2006.01)
*B60C 25/132* (2006.01)
*B60C 25/138* (2006.01)

(52) U.S. Cl.
CPC ...... *B60C 25/0563* (2013.01); *B60C 25/0578* (2013.01); *B60C 25/132* (2013.01); *B60C 25/138* (2013.01)

(58) Field of Classification Search
CPC .............. B60C 25/0563; B60C 25/138; B60C 25/0578; B60C 25/132
See application file for complete search history.

(56) References Cited

U.S. PATENT DOCUMENTS

| | | | | |
|---|---|---|---|---|
| 7,341,090 | B2* | 3/2008 | Gonzaga | B60C 25/138 157/1.17 |
| 7,621,311 | B2* | 11/2009 | Lawson | B60C 25/138 157/1 |
| 2004/0221964 | A1* | 11/2004 | Bonacini | B60C 25/138 157/1.28 |

FOREIGN PATENT DOCUMENTS

| | | |
|---|---|---|
| CN | 2023197463 U | 7/2012 |
| EP | 1714807 A1 | 10/2006 |
| EP | 2524821 A1 | 11/2012 |

OTHER PUBLICATIONS

European Search Report for Italian Patent Application No. VR2014A000194 dated Apr. 7, 2015. (9 pages).

* cited by examiner

*Primary Examiner* — Richard Chang
(74) *Attorney, Agent, or Firm* — Tutunjian & Bitetto, P.C.

(57) ABSTRACT

The present invention concerns a device for assembling-disassembling a tired wheel (TW) comprising a support component, an extension or stem component connected to the support component, a working tool articulated to the extension or stem component and actuation means intended to drive the sliding of the extension or stem component with respect to the support component.

23 Claims, 3 Drawing Sheets

DEVICE FOR ASSEMBLING-DISASSEMBLING A TYRED WHEEL, AS WELL AS MACHINE COMPRISING SUCH A DEVICE

CROSS REFERENCE TO RELATED APPLICATIONS

This application claims the benefit of priority from Italian Patent Application No. VR2014A000194 filed on Jul. 28, 2014, the contents of which are incorporated herein by reference.

TECHNICAL FIELD OF THE INVENTION

The present invention refers to a device for assembling-disassembling a tyred wheel, a tyre assembling-disassembling machine provided with such a device as well as a method for disassembling a tyre from a rim of a tyred wheel.

STATE OF THE PRIOR ART

Up to now many tyre mounting-dismounting machines have been proposed, which are usually equipped with a base, a column rising up from the base and one or more support arms for mounting-dismounting tools. Such tools are usually manually actuated or are driven through a respective actuator during the mounting and dismounting steps, regarding which see, for example, the European patents EP1398184B1 or EP1177920B1.

Such machines are rather complex to be produced and require that control operations of the tool be carried out during every work step.

According to another type of tyre mounting-dismounting machine, see for example the European patents EP1714807B1 and EP2524821B1, the tools are at least partially driven or angularly moved based on the reaction force of the rim or of the tyre of the wheel to be mounted-dismounted.

CN202319763U teaches another solution according to the state of the art.

SUMMARY OF THE INVENTION

The main purpose of the present invention is to provide a new device for assembling-disassembling a tyred wheel.

Another purpose of the present invention is to provide a device for assembling-disassembling a tyred wheel that allows efficient and quick assembling and/or disassembling of a tyred wheel.

Another purpose of the present invention is to provide a device for assembling-disassembling a tyred wheel that can easily be positioned in working position, in particular in work processes or cycles after the first.

Another purpose of the present invention is to provide a new tyre assembling-disassembling machine.

In accordance with an aspect of the invention a device is foreseen according to the present principles.

In accordance with another aspect of the invention a tyre assembling-disassembling machine is foreseen according to the present principles.

In accordance with another aspect of the invention a disassembling method is foreseen according to the present principles.

The dependent claims refer to preferred and advantageous embodiments of the invention.

BRIEF DESCRIPTION OF THE DRAWINGS

Other characteristics and advantages of the invention will become clearer from the description of an embodiment of an assembling-disassembling device, illustrated for indicating purposes in the attached drawings, in which.

In the attached drawings parts or component that are the same are marked with the same reference numerals.

DETAILED DESCRIPTION

With reference to FIGS. 1 to 7, a device 1 for assembling and/or disassembling a tyred wheel according to the present invention is illustrated, which comprises a support component 2 as well as an extension or stem component 3 connected to the support component 2 so as to be able to slide with respect to it along a sliding direction A-A.

The extension or stem component 3 comprises a first end 3a and a second end 3b and is slidably connected to the support component 2, for example as will be explained more clearly hereafter, at the second end 3b or at an intermediate portion thereof 3c extending between the first 3a and the second end 3b. Preferably, the extension or stem component 3 has a main axis of extension x-x substantially aligned with the sliding direction A-A. Preferably, the extension or stem component 3 is arranged with a substantially vertical trim or slightly inclined with respect to the vertical, this in particular for tyre assembling-disassembling machines with the wheel arranged with the rotation axis vertical or slightly inclined with respect to the vertical.

The device also comprises a working tool 4, which is articulated to the extension or stem component 3 about at least one articulation axis y-y, z-z substantially transversal or perpendicular to the sliding direction A-A. Moreover, the working tool 4 is articulated proximal to the first end 3a and distal from the second end 3b of the extension or stem component 3. Concerning this, advantageously, the longitudinal axis (x-x) of the extension or stem component 3 or of a portion of the extension or stem component 3 at its first end 3a is arranged substantially aligned with the longitudinal axis of the working tool 4 or of a portion of the working tool at its second end 4b, at least when the working tool 4 is in the rest position that will be discussed further hereafter, although even in such a position the working tool 4 could be inclined, preferably slightly, with respect to the extension or stem component 3.

Preferably, in use, the articulation axis y-y, z-z of the working tool 4 with respect to the extension or stem component 3 is substantially perpendicular to the axis of symmetry q-q of the rim of a tyred wheel to be treated (assembled-disassembled). Even more preferably, the sliding direction A-A of the extension or stem component 3 is entirely (particularly when the extension or stem component 3 is substantially straight or with straight longitudinal axis) or in part (particularly when the extension or stem component 3 is substantially curved) substantially aligned with or parallel to the axis of symmetry q-q of the rim of a tyred wheel to be treated (assembled-disassembled).

The working tool 4 is articulated to the extension or stem component 3 so as to be angularly movable, in use, in other words during the assembling or disassembling of a tyred wheel, with respect to the extension or stem component 3 by means of the reaction force exerted to the working tool 4 by a rim W and/or tyre T of the tyred wheel TW, advantageously, while the movement of the extension or stem component 3 along the direction A-A is driven or controlled.

Advantageously, the extension or stem component 3 constitutes a thrusting element for the working tool 4, with the term thrust meaning that upon actuation, as will be made clearer hereafter, of the extension or stem component 3, the working tool 4 is controlled to move, preferably, in the same direction as the extension or stem component 3 or parallel to the sliding direction, even if then when the tool abuts or engages the rim W or the tyre T of a tyred wheel TW to be treated, a reaction force is applied to it that tends to move it angularly and then its movement (of the tool) is actually interrupted or partially blocked along the sliding direction A-A or parallel thereto. Moreover, the tool could also not be moved along a sliding direction A-A or parallel thereto, for example in the case in which the extension or stem component 3 is configured differently, for example curved.

Even more advantageously, the extension or stem component 3 constitutes a thrusting and support element for the working tool 4, by the term support meaning that the working tool 4 is supported by the extension or stem component 3, in other words the extension or stem component 3 supports the weight of the tool 4 (if so desired also with interposition of intermediate components, such as a shackle element, as will be made clearer hereafter) and thus keeps it lifted.

Preferably, the working tool 4 has a substantially free first end or treatment end 4a as well as a second end 4b or an intermediate portion articulated to the extension or stem component 3 so that the working tool is angularly movable with respect to the extension or stem component 3 by means of the reaction force exerted on the treatment end 4a of the treatment tool 4 by a rim W and/or tyre T of the tyred wheel TW during the assembling or disassembling thereof by means of the tool itself, advantageously, while the movement of the extension or stem component 3 is driven or controlled.

The tool 4 can have a substantially plate-like configuration with free end 4a for engaging beads of a tyre, for example curved, if so desired having one or a pair of indentations or enlarged portions 4c, 4d intended to delimit respective engagement zones of the tool 4.

The working tool 4 can be articulated or hinged directly, in other words without interposition of connecting rod or shackle elements, to the extension or stem component 3, or rather to its first end 3a, about an articulation axis y-y, z-z, or with interposition of articulation components, such as connecting rods or shackles. Concerning this and with specific reference to the non-limiting embodiment illustrated in the figures, the device 1 comprises at least one shackle element 5, on one side, articulated or rather hinged through a first pin 6a about a first articulation axis y-y to the working tool 4, or rather to the second end 4b or to an intermediate portion thereof, while on the other side, the shackle element 5 is articulated or rather hinged through a second pin 6b about a second articulation axis z-z to the extension or stem component 3, the first y-y and the second z-z articulation axis being substantially parallel to one another. In this case, the tool 4 is articulated to the extension or stem component 3 through and with interposition of the shackle element 5.

According to the non-limiting embodiment illustrated in the figures (see in particular FIGS. 3 and 4), the shackle element 5 can comprise a first end 5a for articulation to the extension or stem component 3, for example substantially forked and delimiting a housing and hinging seat, through the second pin 6b, of the first end 3a of the extension or stem component 3.

The device can also comprise a block component 7 that, on one side, can be hinged, through the first pin 6a to the second end 5b of the shackle element 5 and at the other side can be connected to the tool 4. Of course, alternatively, the second end 4b of the tool 4 can be directly hinged or articulated to the shackle element 5.

In greater detail, again referring to the non-limiting embodiment illustrated in the figures, the block component 7, on one side, can delimit a cradle 7a for housing and hinging the second end 5b of the shackle element 5 and, on the other side, it can delimit an insertion channel 7b, if so desired substantially to size, of the second end 4b of the tool 4. The insertion channel 7b can be substantially C-shaped and open towards the tool 4, so that it is possible to insert therein the second end 4b of the tool 4, and therefore, if so desired block the latter in position through a pawl 8 that can engage in the block component 7 after the connection of the latter to the tool 4. Basically, if a block component 7 is provided, the tool 4 is substantially fixed or able to be fixed with respect to it.

In the case in which a shackle element 5 is provided, advantageously, the extension or stem component 3 constitutes a thrusting element of the shackle element 5, which, in turn, thrusts and moves the working tool 4 along the sliding direction or parallel thereto. Even more advantageously, the extension or stem component 3 constitutes a thrusting and support element for the working tool 4 and for the shackle element 5, which means that both the working tool 4 and the shackle element 5 are supported by the extension or stem component 3.

Advantageously, the distance between the first end 3a of the extension or stem component 3 and the working tool 4, more specifically between the first end 3a and the second end 4b of the tool 4 is lower than the distance between the second end 3b of the extension or stem component 3 and the tool 4, more specifically between the second end 3b and the second end 4b of the tool 4, substantially by the extension or length of the extension or stem component 3 or, if the tool 4 is articulated directly to the extension component 3, the distance between the second end 3b and the tool 4 is substantially equal to the extension or length of the extension or stem component 3 itself.

The articulation of the tool to the extension or stem component 3, for example with interposition of the shackle element 5, can be obtained by hinging the tool to the extension or stem component 3 or the tool to a shackle element 5 in turn hinged to the extension or stem component, if so desired also providing elastic loading means, such as springs, for example mounted on an articulation pin, such as the pins 6a and/or 6b, which elastic loading means are intended to counteract the angular movement of the tool 4 with respect to the extension or stem component 3 and, if foreseen, with respect to the shackle element 5, but such elastic loading means limit but do not prevent such an angular movement.

Basically, preferably, the device is not equipped with active angular movement means, such as actuators, of the tool 4 with respect to the extension or stem component 3 or, if foreseen, of the tool 4 with respect to the shackle element 5 and of the shackle element 5 with respect to the extension or stem component 3.

If so desired, if a shackle element 5 is foreseen, the articulation axis y-y of the tool 4 to the shackle element 5 and the articulation axis z-z of the shackle element 5 to the extension or stem component 3 are substantially aligned (at least in a rest position of the device) along a vertical plane passing through the sliding direction A-A.

As an alternative to pins, if so desired also elastically loaded, the articulation of the tool 4 to the extension or stem component 3 can be obtained by forming one or more slots in the tool or in the extension or stem component 3 as well as by fixing a pin to one end of the other between extension or stem component 3 and tool 4, which pin is intended to slidably engage the slot or slots.

The device also comprises actuation means 9 designed to drive the sliding of the extension or stem component 3 with respect to the support component 2 along the sliding direction A-A as well as of the tool 4 along the sliding direction A-A or parallel thereto. The tool 4 can be movable along a direction parallel to the sliding direction A-A, for example, if the extension component 3 or the tool 4 has an end, 3a or 4b respectively, shaped like an L, or if an intermediate element (if so desired the shackle element 5) is foreseen between tool 4 and extension or stem component substantially perpendicular or transversal to the latter.

As stated above, it should be repeated that when the tool 4 abuts on or engages with the rim W or the tyre T of a wheel TW to be treated, the latter apply a reaction force to the tool that determines an angular movement of the tool and therefore, even if the movement of the extension or stem component 3 is still being commanded along the sliding direction A-A, the movement of the tool along the sliding direction A-A is interrupted or partially obstructed. Moreover, as stated above, the tool could even not be moved along a sliding direction A-A or parallel thereto.

Advantageously, the actuation means comprise at least one cylinder 9, whereas the second end 3b of the extension or stem component 3 is slidably mounted in the cylinder 9 and can be moved through insertion or suctioning of liquid or gas into or from the cylinder 3a. The cylinder 9 is also in fluid communication with a suitable fluid source (gas or liquid), for example under pressure. According to such a variant, the extension or stem component 3 and the cylinder 9 actually constitute a pneumatic, hydraulic or electric actuator. It can be seen how such a statement does not contradict what has been stated earlier, since we repeat that the device is not equipped with active angular movement means, such as actuators, of the tool 4 with respect to the extension or stem component 3, because the extension or stem component 3, although it can actually be a part of an actuator, does not determine the angular movement of the tool, but rather only the movement thereof along a sliding direction A-A or parallel thereto, whereas then the angular movement of the tool is in fact assigned or due to the reaction force of a rim and/or tyre of a tyred wheel that is assembled or disassembled through the device.

As will be understood, moreover, the actuation means could also be different from those described above and comprise, for example, a pinion intended to engage and drive the translation of a rack portion of the extension or stem component, or a recirculating ball screw system or an electric motor or another type of motor intended to drive the movement of the extension or stem component.

Be that as it may, the actuation means are, preferably, actuatable so as to drive the sliding of the extension or stem component 3 along a first and a second direction of movement, preferably opposite, along the sliding direction A-A so as to bias the second end 4b or an intermediate portion of the working tool 4 in the same direction of movement as the extension or stem component 3 or parallel thereto.

Moreover, the actuation means 9 are arranged to control the sliding of the extension or stem component 3 between a retracted position and an extended position along the sliding direction A-A, thereby determining, as a function of the afore-said reaction force, the insertion (during the assembly) or the extraction (during the disassembly) of the working tool 4 between a portion of a tyre T and a portion of a respective rim W as well as the grip of a portion of the tyre T.

More specifically, the working tool 4 is moveable between a first position or rest position, in which it can for example be substantially aligned with respect to the extension or stem component 3 and one or more second positions or moving positions or position of assembling/disassembling, in which it is angularly moved with respect to the rest position by means of the reaction force exerted on the tool or rather on the first end of the tool 4 by a rim W and/or tyre T of the tyred wheel TW.

In the case in which a shackle element 5 is provided, it is moveable between at least one first trim or rest trim, in which it can for example be substantially aligned with respect to the extension or stem component 3 and/or to the tool 4 and one or more second moving trims, in which it is angularly moved with respect to the rest position, again as a function of the reaction force exerted on the tool or rather on the first end 4a of the tool 4 by a rim W and/or tyre T of the tyred wheel TW.

The extension or stem component 3, on the other hand, is movable along the sliding direction between a retracted position and one or more extended positions.

Preferably, moreover, the extension or stem component 3, during the various assembling or disassembling steps is moved, but in a controlled manner, by the actuation means, in the sense that it cannot be withdrawn in an uncontrolled manner manually or due to its own weight.

On the other hand, in particular as far as the support component 2 is concerns, it can comprise an arm, for example and advantageously a canti-levered arm 2a having a longitudinal axis w-w, if so desired substantially horizontal, whereas the extension or stem component 3 is connected to the arm 2a so that the sliding direction A-A of the extension or stem component is substantially transversal or perpendicular to the longitudinal axis w-w of the canti-levered arm 2a. If so desired, but not necessarily, the articulation axis y-y, z-z of the working tool 4 is substantially transversal or perpendicular to the longitudinal axis w-w of the arm 2a.

Preferably, the support component 2 also comprises a sleeve element 2b, if so desired arranged with substantially vertical trim, slidably mounted with respect to the canti-levered arm 2a and supporting, if so desired at the top, the actuation means, for example the cylinder 9. In this case it is also foreseen for there to be locking-unlocking means, for example a clamping component 10, of the position of the sleeve element 2b with respect to the canti-levered arm 2a. According to such a variant, the extension or stem component 3 can be slidably mounted in the sleeve element 2b, which can thus also constitute a guide element for the sliding of the extension or stem component 3. By adjusting the position of the sleeve element 2*b* with respect to the cantilevered arm 2*a* it is indeed possible to adjust the position of the extension or stem component 3 and, if so desired of the cylinder 9 with respect to the support arm 2*a*, in particular along the main axis of extension x-x or along the sliding direction A-A.

Of course, the extension or stem component 3 could also not be mounted in the sleeve element 2*b*, but outside of it, for example substantially parallel thereto.

Advantageously, the support component 2 further comprises a tubular element 2*c*, if so desired arranged with substantially vertical trim, extending from the canti-levered arm 2*a* and connected, if so desired welded thereto. In this case, the sleeve element 2*b* can be slidably mounted in the tubular element 2*c* and fixable in position with respect to it through the locking-unlocking means 10.

As far as the clamping component 10 is concerned, it can be pneumatically or electrically actuated and can for example comprise an actuator 10*a* in connection with a plate 10*b* delimiting a through hole in which a portion of the sleeve element 2*b* is mounted and arranged, in use, so that by actuating the actuator 10*a* it determines a movement of the plate 10*b* that thus engages the sleeve element 2*b* preventing the translation thereof along the main axis of extension x-x or along the sliding direction A-A. The actuator 10*a* can be supported by a bracket 10*c* connected or fixed, for example welded, to the canti-levered arm 2*a* or, if foreseen, to the tubular element 2*c*.

Advantageously, the cylinder 9 of the actuation means, if foreseen, can be supported by a frame 11 mounted or supported by the tubular element 2*b*, more specifically at an end thereof distal from the tool 4.

Suitable control means or buttons CB for the actuation means 9 are also provided and, if foreseen, for the locking means 10, which can for example be foreseen on a handle 2*d* or the like, rising up, if so desired, from the tubular element 2*c*.

The device can also be equipped with stopping means 12*a* of the angular movement of the tool 4 with respect to the extension or stem component 3 in a first direction of rotation about the articulation axis y-y, which allow the angular movement of the working tool 4 only in a second direction of rotation opposite to the first direction. The stopping means can comprise an abutment element, if so desired a first rod element 12*a* fixed to the extension or stem component 3 and/or, if foreseen to the shackle element 5 and on which the second end 4*b* or, if foreseen, the block component 7 abuts, when the tool 4 is in rest position.

If so desired, there is also a second abutment element 12*b* fixed to the sleeve element 2*b* and intended to prevent or stop, when the extension or stem component 3 is in retracted position, the angular movement of the shackle element 5 with respect to the extension or stem component 3 in a first direction of rotation about the articulation axis y-y, which however do not impede the rotation in the opposite direction. The first end 5*a* of the shackle element 5 abuts on the second abutment element 12*b*, when it is in rest trim and the stem component 3 is in retracted position.

The device according to the present invention can also be equipped with a base 13 supporting the support component 2.

A column 14 supporting, in particularly supporting at its top, the support component 2, for example the canti-levered arm 2*a* thereof, can protrude upwards, in use, from the base 13. The column 14 can support a bush component 15 in which the canti-levered arm 2*a* of the support component 2 is slidably mounted and fixable in position, for example through stopping means 16, such as a clamp or the like. The presence of a bush component 15 and of the stopping means 16 makes it possible to move the support component 2 and in particular the support arm 2*a* and therefore the tool 4 so as to adapt it to the dimensions or rather the width of a wheel to be treated (assembled-disassembled). Alternatively, it is possible to foresee a canti-levered arm 2*a* articulated, if so desired about a vertical axis, so as to be able to angularly move the arm 2*a* and therefore the tool 4 or make it to carry out slewing adjustment displacements.

Advantageously, the support component 2 is pivoted to the base 13 about a first rotation axis k-k, through a pin 17, so that it is possible to move the support component 2 together with the extension or stem component 3 and with the working tool 4 between a working position (see FIG. 6) and an overturned position (see FIG. 7) with respect to the base.

More specifically, this can be obtained by hinging the support component 2 to the base 13 or the support component 2, for example the bush component 15, to the column 14.

In accordance with the present invention, a tyre assembling-disassembling machine is also foreseen comprising at least one device according to the present invention, as well as support means 18 for a rim W of or for a tyred wheel TW, such as a wheel-carrying table 18, on which it is possible to arrange a rim W of or for a tyred wheel TW, which is then clamped through constraining means, for example inserting a shaft on which a so-called "centring" cone 19 is fitted into a hole formed in the table 18 and then clamping the rim W between table 18 and centring cone 19. Other support and constraining means could also be provided, such as claw elements or components of another suitable type.

The table or the claws can for example be supported by an upright 20 rising up, if so desired, from the base 13. Alternatively, the machine and the device could be separate from one another, in which case the device could be supported by its own base and, where necessary, be associated with or approached to a tyre assembling-disassembling machine complete with support and constraining means.

The support means 18 could be motorised and rotatable so as to be arranged to set a rim a rim or a tyred wheel mounted on them in rotation about a second rotation axis q-q, which, in use, corresponds to the axis of symmetry and rotation q-q of the rim W. Alternatively, the support means 18 could be fixed, in which case the device or rather the base thereof could be rotatable or mounted on wheels, so that it is possible to drag the device around the rim or the wheel mounted on the support means 18.

Moreover, the support means could be movable, for example liftable and lowerable and/or translatable horizontally. This could be useful to vertically and/or horizontally move the support means 18 towards/away from the tool 4 of a device according to the present invention. In this case, it would not be necessary to foresee adjustable support means 2, in particular an arm 2*a* able to move vertically or along a sliding direction or mounted in a bush component 15 and fixable through stopping means 16.

With an assembling-disassembling device according to the present invention, first a tyred wheel complete with tyre T and rim W is locked, for example arranging it on the support means 18 and then locking the rim in position, for example through suitable constraining means 19, which could also be integrated (for example in the case of claws) in the support means. The wheel must then suitably be bead broken through suitable bead-breaking tools, also foreseen, if desired, in a machine according to the present invention.

At this point, a device according to the present invention is arranged with the tool 4 in rest position, extension or stem component 3 in retracted position and if a shackle element 5 is foreseen, with such a shackle element 5 in rest trim.

The device 1 and/or the support means 18 are then moved so as to bring the tool 4 or rather its first end 4a at a side of the wheel TW and close to the circumferential area of the tyred wheel TW of contact between tyre T and rim W, preferably resting on a portion of a first edge W1 of the rim W and/or on a portion of the respective first bead T1 of the tyre T. Such positioning can also be partially obtained by driving the actuation means 9 so as to move the extension or stem component 3 in the sliding direction from the first to the second trim, in other words towards the tyred wheel TW.

At this point, the actuation means 9 are driven or driven again, so as to move the extension or stem component 3, for example the extension thereof outside of the cylinder 9, in particular along the sliding direction A-A, from a retracted position to an extended position. In this way, the tool 4, or rather its first free end 4a, is deeply inserted or caused to deeply insert between a portion of the first bead T1 of the tyre T and a portion of the first edge W1 of the rim W. Following this, the tool 4 is angularly moved, in particular between the rest position and respective moving positions, in which it is angularly moved about the articulation axis y-y with respect to the extension component 3 and, if a shackle element 5 is foreseen, also the shackle element 5 is angularly moved about the articulation axis z-z with respect to the extension component 3. The shackle element 5 moves angularly in the same direction of rotation as the working tool 4.

During this step, the angular movement of the tool 4 and, if foreseen, of the shackle element 5 is obtained by means of a reaction force exerted by the rim W or by the tyre T on the tool 4 or rather on the free end 4a thereof.

The tool 4 can thus be arranged substantially inclined with free end 4a closer to the axis q-q of the rim and second end 4b farther from such an axis q-q and also the tool 4 grips a portion of a first bead T1 of the tyre T.

If so desired, in order to facilitate the insertion of the tool 4 between tyre T and rim W, during such a step, it is also possible to set the tyred wheel TW in rotation, for example through rotation of the support means 18.

Figures 1, 2, 3, 4:
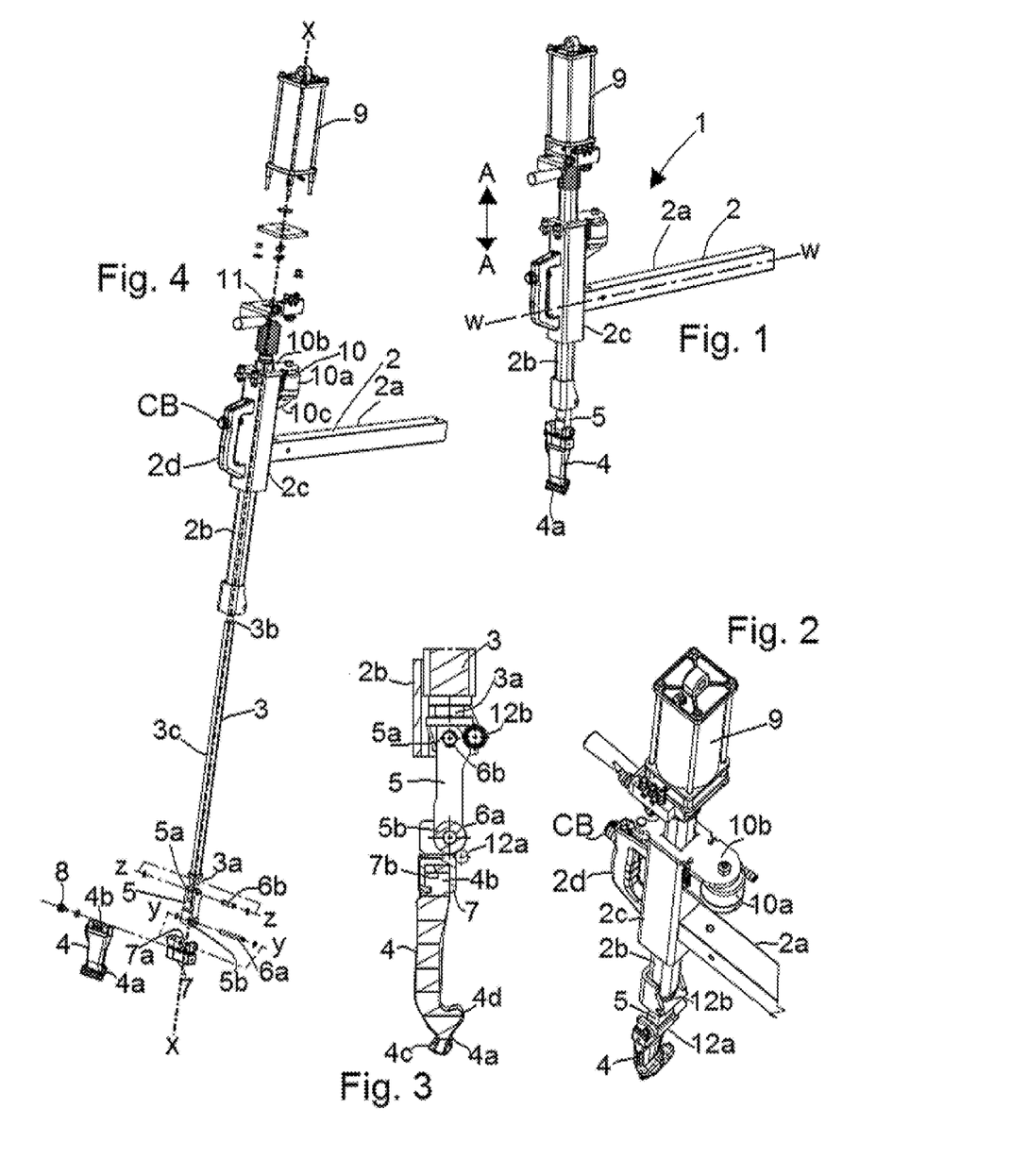
FIG. 1 is a perspective view slightly from above and from one side of an assembling-disassembling device according to the present invention.
FIG. 2 is a perspective view from above and from another side of the device of FIG. 1.
FIG. 3 is a section view of part of the device of FIG. 1.
FIG. 4 is an exploded view of the device of FIG. 1.
Figure 5:
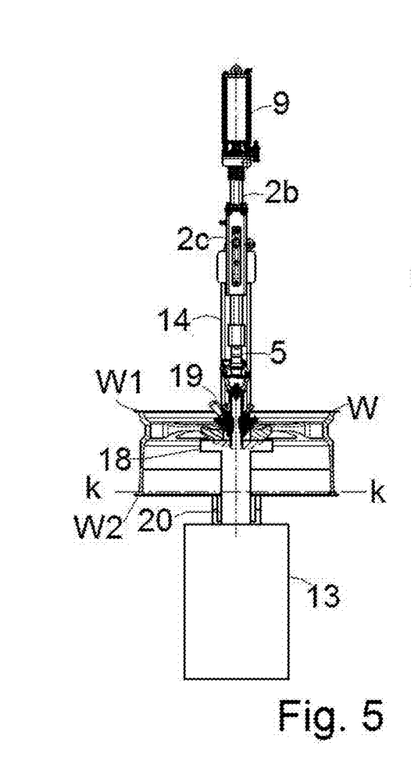
FIG. 5 is a front view with parts in transparency of a tyre assembling-disassembling machine according to the present invention equipped with the device of FIG. 1.
Figure 6:
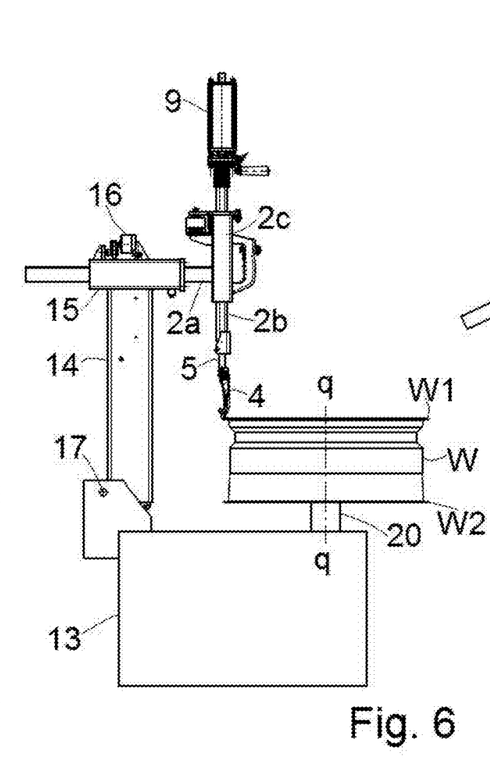
FIGS. 6 and 7 are side views of the machine of FIG. 5 with the device in working and overturned positions, respectively.
Figure 7:
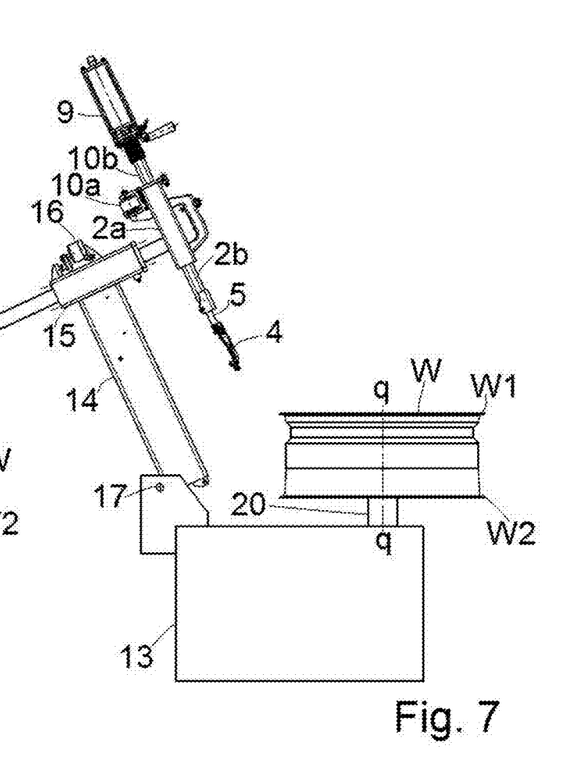
Figure 8:
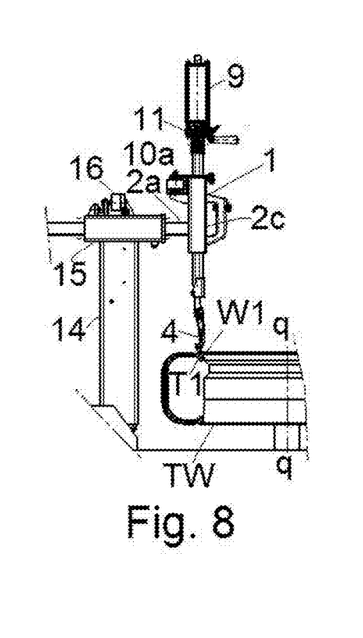
FIGS. 8 to 11 illustrate respective disassembling steps through a device according to the present invention.
Figure 9:
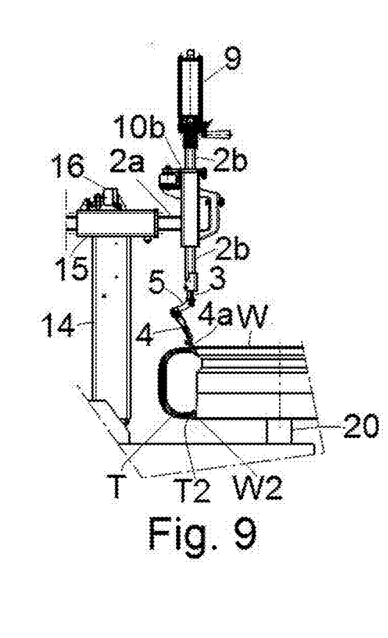
Figure 10:
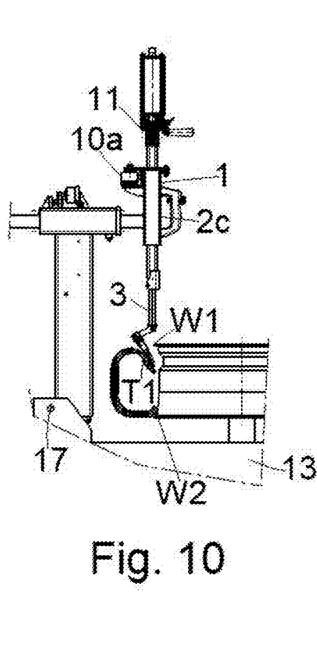
Figure 11:
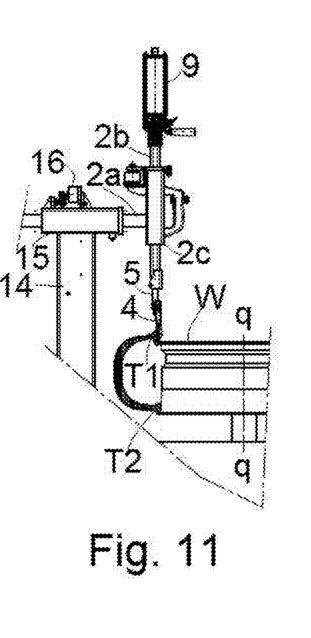

After the tool 4 has gripped a portion of the first bead T1 of the tyre T through its free end 4a, the actuation means 9 are driven backwards, so as to take the extension component 3 back into or towards the retracted position (step between FIGS. 10-11), thus taking the tool 4 back towards or into the first position, therefore rotating in the direction opposite to before, together with the gripped portion of the first bead T1 of the tyre T, meaning that the tool 4 drags the gripped portion of the first bead T1 of the tyre beyond the respective first edge W1 of the rim or outside the zone between first W1 and second W2 edge of the rim W. If a shackle element 5 is foreseen, during this step it is made to rotate or angularly move in the direction opposite to before and brought back into or towards the rest trim.

Then by setting the tyred wheel TW or the device 4 in rotation about the wheel TW it is possible to complete the disassembling of the first bead T1 of the tyre T by bringing the entire first bead T1 beyond the respective first edge W1 of the rim or outside of the zone between first W1 and second W2 edge of the rim W.

The second bead T2 of the tyre can then be disassembled with a device according to the present invention, with another known device or by pushing the tyre T so as to move the second bead T2 towards the first edge W1 so as to determine the passage of the second circumferential bead T2 beyond the respective first edge W1 of the rim and outside of the zone between first W1 and second W2 edge of the rim W.

Thereafter, if another or second tyred wheel with the same dimensions as the first wheel now disassembled should be disassembled, in the case in which the support component 2 were hinged to the base, then it would be possible to move the support component 2 in overturned position, so as to move the tool 4 away from the first wheel TW, release it from the support and constraining means and then arrange another tyred wheel TW on the support means 18, then locking the rim in position. At that point, after having bead broken also the bead of such a second wheel, in order to take the device into the correct position to begin the disassembling, it would be sufficient to drive the angular movement of the support component 2 from the overturned position to the working position.

On the other hand, to mount a tyre T on a rim W, substantially the reverse of what is described above is carried out and, if so desired, using auxiliary tools, such as rollers or similar that help the tool 4 during the steps of the method, for example by pushing a portion of the tyre in positions angularly moved with respect to that of action of the device.

As will be understood, a device and a method according to the present invention make it possible to easily disassemble and assemble a tyre on and from a rim in an efficient and quick manner.

Unlike most devices for assembling and/or disassembling a tyred wheel with actuators for the movement of a tool, like those taught by EP1398184B1 or EP1177920B1, a device according to the present invention has a much simpler structure and, moreover, the tool is angularly moved as a function of the reaction force of a rim or a tyred wheel, which allows better assembling and disassembling, since the tool is angularly moved so as to follow the profile of the components of the wheel, without ruining them. The actuation means 9, if on the one hand they act to push or if so desired support the weight of the tool 4, they actually move only the extension or stem component 3 and, if so desired, components articulated to them, such as the tool and, if foreseen, the shackle element 5, along the sliding direction A-A. Therefore, the actuation means do not determine the angular movement of the tool, but rather only the movement thereof substantially parallel to the rotation axis of the rim, whereas the angular movement of the tool and, if foreseen, of the shackle element 5, is obtained as a function of the reaction force exerted on it by the rim and/or by the tyre.

With reference, on the other hand, for example to EP1714807B1 or EP2524821B1, a device according to the present invention has a different structure from those of such prior art patents and comprises, amongst other things, an extension or stem component intended to thrust the tool, so as to ensure a quicker and more efficient actuation of the tool itself with respect to devices according to the state of the art. Moreover, in a device according to the present invention, unlike the devices taught in EP1714807B1 or EP2524821B1, the arm or the support component are kept stationary for most of the assembling-disassembling steps, while the extension or stem component is moved. Moreover, an extension or stem component of a device according to the present invention could, if so desired, also support the weight of a working tool—a characteristic that is absent and unable to be derived from the prior art solutions proposed up to now.

It should also be noted that in the case in which a device according to the present invention is equipped with a support component 2 hinged to the base 13, it ensures very quick positioning of the device in a correct position to start the assembling or disassembling of wheels after a first wheel has been assembled or disassembled since, as indicated above, in order to do so it is sufficient to drive the angular movement of the support component 2 from the overturned position to the working position.

Modifications and variants of the invention are possible within the scope of protection defined by the claims.

The invention claimed is:

1. A device for assembling and/or disassembling a tyred wheel comprising:
    a support component;
    an extension or stem component connected to said support component so as to be able to slide with respect to said support component along a sliding direction, said extension or stem component comprising a first end and a second end and being slidably connected to said support component at said second end or at an intermediate portion extending between said first and said second ends of said extension or stem component;
    a working tool articulated to said extension or stem component about at least one articulation axis substantially transverse or orthogonal to said sliding direction, said working tool being articulated to said extension or stem component so as to be angularly movable with respect to said extension or stem component between a first position or rest position and at least one second position or moving position by means of a reaction force exerted, while movement of said extension or stem component is driven along said sliding direction, to a first end or treatment end of said working tool by a rim and/or by a tyre of said tyred wheel, said working tool being articulated to said extension or stem component proximal to said first end of said extension or stem component and distal from said second end of said extension or stem component;
    actuation means designed to drive the sliding of said extension or stem component with respect to said support component along said sliding direction,
    and wherein said extension or stem component has a main axis of extension substantially aligned with said sliding direction.

2. The device according to claim 1, wherein said actuation means are arranged to control the sliding of said extension or stem component between a retracted position and an extended position along said sliding direction, thereby determining the insertion or the extraction of said working tool between a portion of a tyre and a portion of a respective rim as well as the grip of a portion of said tyre.

3. The device according to claim 1, wherein said extension or stem component is a thrusting and support element for said working tool, so that said extension or stem component supports the weight of said working tool.

4. The device according to claim 1, comprising at least one shackle element, articulated, on one side, about a first articulation axis to said working tool and, on the other side, articulated about a second articulation axis to said extension or stem component, said first and said second articulation axes being substantially parallel to one another, so that said working tool is articulated to said extension or stem component by means of and with the interposition of said shackle element.

5. The device according to claim 1, wherein the distance between said first end of said extension or stem component and said working tool is lower than the distance between said second end of said extension or stem component and said working tool substantially by the extension or length of said extension or stem component or the distance between said second end of said extension or stem component and said working tool is substantially equal to the extension or length of said extension or stem component.

6. The device according to claim 1, wherein said actuation means comprise at least one cylinder and wherein said second end of said extension or stem component is slidably mounted within said cylinder and is movable by inserting or suctioning liquid or gas into or from said cylinder.

7. The device according to claim 1, comprising a base as well as a column protruding, in use, upwards from said base and supporting said support component, and wherein said support component comprises an arm having a longitudinal axis, whereas said extension or stem component is connected to said arm so that said sliding direction of said extension or stem component is substantially transverse or orthogonal to said longitudinal axis of said arm.

8. The device according to claim 7, wherein said support component comprises a sleeve element slidably mounted with respect to said arm and supporting said actuation means, said support component further comprising locking-unlocking means for locking-unlocking the position of said sleeve element with respect to said arm.

9. The device according to claim 8, wherein said extension or stem component is slidably mounted in said sleeve element.

10. The device according to claim 8, wherein said support component comprises a tubular element extending from said arm, said sleeve element being slidably mounted in said tubular element and fixable in position with respect thereto by means of said locking-unlocking means.

11. The device according to claim 1, wherein said working tool has a second end or an intermediate portion articulated to said extension or stem component in such a way that said working tool is angularly movable with respect to said extension or stem component by means of the reaction force exerted on said treatment end of said working tool by a rim and/or by a tyre of said tyred wheel while assembling or disassembling the latter.

12. The device according to claim 11, wherein said actuation means are actuatable so as to drive the sliding of said extension or stem component along a first and a second direction of movement along said sliding direction so as to bias said second end or said intermediate portion of said working tool in the same direction of movement as said extension or stem component.

13. The device according to claim 11, wherein the longitudinal axis of said extension or stem component or of a portion of said extension or stem component at its first end is arranged in substantial alignment with the longitudinal axis of said working tool or of a portion of said working tool at its second end, when said working tool is in said rest position.

14. The device according to claim 1, comprising stopping means for stopping the angular movement of said working tool with respect to said extension or stem component in a first direction of rotation, said stopping means allowing the angular movement of said working tool only in a second direction of rotation opposite to said first direction.

15. The device according to claim 1, comprising at least one base supporting said support component, said support component being pivoted to said base about an axis of rotation, so that it is possible to move said support component together with said extension or stem component and with said working tool between a working position and an overturned position with respect to said base.

16. The device according to claim 1, wherein said actuation means are arranged to control the sliding of said extension or stem component from a retracted position to an extended position, thereby inserting or causing the deep insertion of said tool between a portion of a tyre and a portion of a respective rim, moving said tool between said rest position and said at least one second position, as well as to control the backwards sliding of said extension or stem component from said extended position and said retracted position, so as to displace said working tool with a gripped portion of said first bead beyond the respective first edge of the rim or outside the zone between first and second edge of the rim moving said tool between said at least one second position and said first position.

17. The device according to claim 1, wherein said actuation means are intended to control the sliding of said tool along said sliding direction or parallel thereto.

18. A tyre assembling-disassembling machine comprising at least a device for assembling and/or disassembling a tyred wheel comprising:
a support component;
an extension or stem component connected to said support component so as to be able to slide with respect to said support component along a sliding direction, said extension or stem component comprising a first end and a second end and being slidably connected to said support component at said second end or at an intermediate portion extending between said first and said second ends of said extension or stem component;
a working tool articulated to said extension or stem component about at least one articulation axis substantially transverse or orthogonal to said sliding direction, said working tool being articulated to said extension or stem component so as to be angularly movable with respect to said extension or stem component between a first position or rest position and at least one second position or moving position by means of a reaction force exerted, while movement of said extension or stem component is driven along said sliding direction, to a first end or treatment end of said working tool by a rim and/or by a tyre of said tyred wheel, said working tool being articulated to said extension or stem component proximal to said first end of said extension or stem component and distal from said second end of said extension or stem component;
actuation means designed to drive the sliding of said extension or stem component with respect to said support component along said sliding direction,
and wherein said extension or stem component has a main axis of extension substantially aligned with said sliding direction, and
support and constraining means of a rim of or for a tyred wheel.

19. The machine as claimed in claim 18, wherein said support and constraining means are arranged to support a rim or a tyred wheel with axis of symmetry and rotation, said sliding direction of said extension or stem component being at least partly aligned with or parallel to said axis of symmetry and rotation.

20. The machine as claimed in claim 18, wherein said support and constraining means are motorised and rotatable so as to be arranged to set a rim or a tyred wheel mounted thereon in rotation about a rotation axis, said sliding direction of said extension or stem component being at least partly aligned with or parallel to said rotation axis.

21. A method for disassembling a tyre from a rim of a tyred wheel with a device for assembling and/or disassembling a tyred wheel comprising:
a support component;
an extension or stem component connected to said support component so as to be able to slide with respect to said support component along a sliding direction, said extension or stem component comprising a first end and a second end and being slidably connected to said support component at said second end or at an intermediate portion extending between said first and said second ends of said extension or stem component;
a working tool articulated to said extension or stem component about at least one articulation axis substantially transverse or orthogonal to said sliding direction, said working tool being articulated to said extension or stem component so as to be angularly movable with respect to said extension or stem component between a first position or rest position and at least one second position or moving position by means of a reaction force exerted, while movement of said extension or stem component is driven along said sliding direction, to a first end or treatment end of said working tool by a rim and/or by a tyre of said tyred wheel, said working tool being articulated to said extension or stem component proximal to said first end of said extension or stem component and distal from said second end of said extension or stem component;
actuation means designed to drive the sliding of said extension or stem component with respect to said support component along said sliding direction,
and wherein said extension or stem component has a main axis of extension substantially aligned with said sliding direction,
the method comprising the following steps:
locking in position a tyred wheel to be disassembled;
arranging said device with said working tool at the circumferential area of said tyred wheel at which the tyre and the rim are in contact, said articulation axis of said working tool with respect to said extension or stem component being substantially orthogonal to the axis of symmetry of the rim of said tyred wheel to be treated;
controlling said actuation means so as to move said extension or stem component along said sliding direction from a retracted position to an extended position and inserting in this way said working tool between a portion of a first bead of said tyre and a portion of a first edge of said rim, thereby determining an angular movement of said working tool with respect to said extension or stem component by means of the reaction force exerted on said first end or treatment end of said working tool by said rim and/or by said tyre, until said tool grasps a portion of the first bead of the tyre by means of a free end thereof;
controlling said actuation means backwards, so as to move said extension or stem component backwards along said sliding direction in or towards said retracted position as well as thus moving said working tool with the grasped portion of said first bead beyond the respective first edge of the rim or externally to the area between the first and the second edge of the rim; and placing said tyred wheel or said device in rotation so as to complete the disassembly of the first bead of said tyre; and disassembling the second bead of said tyre.

22. The method according to claim 21, wherein said working tool is arranged at said circumferential outer area by actuating said actuation means so as to move said extension or stem component from a retracted position to an extended position.

23. The method according to claim 21, wherein the sliding direction of said extension or stem component is at least partly substantially aligned with or parallel to the axis of symmetry of the rim of said tyred wheel to be treated.

* * * * *